United States Patent [19]

Dyroff et al.

[11] 4,233,423

[45] Nov. 11, 1980

[54] STABILIZATION OF POLYMERIC ACETAL CARBOXYLATES USING AN ACETAL

[75] Inventors: David R. Dyroff, Creve Coeur; Gary J. Lynch, St. Louis County; Victor D. Papanu, Maryland Heights, all of Mo.

[73] Assignee: Monsanto Company, St. Louis, Mo.

[21] Appl. No.: 91,656

[22] Filed: Nov. 5, 1979

[51] Int. Cl.$^3$ .................... C08G 6/00; C08L 61/02
[52] U.S. Cl. .................................. 525/398; 528/232; 528/489; 528/494
[58] Field of Search .............. 525/398; 528/232, 489, 528/494

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

Primary Examiner—Lucille M. Phynes
Attorney, Agent, or Firm—S. M. Tarter; W. H. Duffey; F. D. Shearin

[57] ABSTRACT

The alkali metal, ammonium and alkanol amine salts of polymeric acetal carboxylates are stable detergent builders and chelating agents. Now, in the improved process of the present invention for preparing an acetal carboxylate polymer wherein a glyoxylate ester and a polymerization initiator are brought together under polymerization conditions and a chemically stable end group is added to the termini of the resulting polymer to stabilize the polymer against rapid depolymerization in alkaline solution, the improvement comprises contacting the resulting polymer in the presence of an acid catalyst with a sufficient amount of an acetal having 3 to 20 carbon atoms to stabilize the resulting polymer against rapid depolymerization in alkaline solution, and an agent to remove liberated alcohol.

8 Claims, No Drawings

STABILIZATION OF POLYMERIC ACETAL CARBOXYLATES USING AN ACETAL

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPP in detergent compositions. The composition of such polymeric acetal carboxylates has been disclosed in U.S. Pat. No. 4,144,226 issued Mar. 13, 1979 and in Ser. No. 962,512 filed Nov. 20, 1978. The use of such polymeric acetal carboxylates in detergent compositions is disclosed in U.S. Pat. No. 4,146,495 issued Mar. 27, 1979. A preferred method for the saponification of the esters of the polymeric acetal carboxylates to form the corresponding alkali metal salt is disclosed in U.S. Pat. No. 4,140,676 issued Feb. 20, 1979. The polymeric acetal carboxylate salts described in the above applications and patents were tested for sequestration function using the procedures described by Martzner et al in "Organic Builder Salts as Replacements for Sodium Tripolyphosphate", TENSIDE, 10, No. 3 pg. 119-125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing polymeric acetal carboxylates disclosed in the above patents and patent applications are satisfactory, it was surprisingly found that the acetal carboxylates could be stabilized by chemically stable groups derived from an acetal according to transacetalization reactions. The reaction of an alcohol with an acetal by transacetalization using phosphorus pentoxide or molecular sieves to remove alcohol to shift the equilibrium toward completion is known to the art (see for example SYNTHESIS, 1975, pages 276-277, and SYNTHESIS, 1976, page 244).

While such reactions may be known to the art, their successful application to the stabilization of polymeric acetal carboxylates was surprising because of the likelihood of side reactions including the depolymerization of the polymeric acetal carboxylate. In addition, the method of the present invention provides a variety of new terminal structures which could not be readily produced by previously known methods of stabilization.

SUMMARY OF THE INVENTION

These and other advantages and unexpected results are achieved in a process for preparing an acetal carboxylate polymer wherein a glyoxylate ester and a polymerization initiator are brought together under polymerization conditions, and a chemically stable end group is added to the termini of the resulting polymer to stabilize the polymer against rapid depolymerization in alkaline solution, the improvement which comprises contacting the resulting polymer in the presence of an acid catalyst with a sufficient amount of an acetal having the formula:

wherein R is hydrogen or alkyl having from 1 to about 6 carbon atoms, and $R^1$ and $R^2$ are individually an alkyl having from 1 to about 6 carbon atoms, to stabilize the resulting polymer against rapid depolymerization in alkaline solution, and an agent to remove liberated alcohol.

For the purposes of this invention, the term "rapid depolymerization in alkaline solution" as it is used in the specification and claims shall mean that in an aqueous solution of 0.5 molar sodium hydroxide containing 10 grams per liter of the polymer product of the present invention, the average chain length of the polymeric acetal carboxylate will be reduced by more than 50 percent, as determined by Proton Magnetic Resonance, after 1 hour at 20° C.

B roadly described, the acetal carboxylate polymer product can be prepared by the present process by bringing together under polymerization conditions a glyoxylate ester and a polymerization initiator, and adding to the termini of the resulting polymer a chemically stable group derived from an acetal having the above formula to stabilize the polymer agains rapid depolymerization in alkaline solution. To prepare the polymer salt for use as a chelant, sequestrant and detergency builder, the stabilized polymer can be saponified with an alkali metal hydroxide to form the corresponding salt. The alkali metal salt can be converted to the ammonium or alkanol amine salt by conventional ion exchange techniques.

The procedure for bringing together in a reaction zone under polymerization conditions a glyoxylate ester and a polymerization initiator, and optionally one or more comonomers, has been described in detail in U.S. Pat. No. 4,144,226 issued Mar. 13, 1979 and such description is herewith incorporated by reference. Broadly described, an ester of glyoxylic acid is prepared by reacting an alcohol containing from 1 to 4 carbon atoms with an acid hemiacetal or acid hydrate under conditions known to those skilled in the art and converting the resulting ester hemiacetal to the corresponding glyoxylate ester by known techniques, such as the reaction of the ester hemiacetal with phosphorus pentoxide. Thereafter, the glyoxylate ester is polymerized using a suitable initiator, such as boron trifluoride etherate, 3 A molecular sieves, or preferably dialkyl sodiomalonate or sodiomethyl malonate esters.

According to the improved process of the present invention, the resulting polymer is contacted in the presence of an acid catalyst with a sufficient amount of an acetal having the formula:

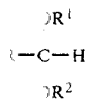

wherein R is hydrogen or alkyl having from 1 to about 6 carbon atoms and $R^1$ and $R^2$ are individually an alkyl having from 1 to about 6 carbon atoms to stabilize the resulting polymer against depolymerization in alkaline solution, and an agent to remove liberated alcohol. There is then provided a polymer product having the formula:

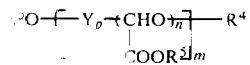

where Y is one or more comonomers randomly distributed along the polymer chain, p is 0 or 1, the product of m and n is at least 4, and $R^3$ and $R^4$ are chemically stable groups derived from the above acetal; and $R^5$ is an alkyl group having 1 to about 4 carbon atoms.

Any number of acetals can be used in the process of the present invention. It is only necessary that the acetal will provide a chemically stable group to stabilize the polymer against depolymerization in alkaline solution and will not interfere with its intended function as a chelant, sequestrant and detergency builder. When R in the above formula is hydrogen, suitable acetals include dimethoxymethane, diethoxymethane, dipropoxymethane and the like. When R is methyl, ethyl and the like suitable acetals include dimethoxyethane, diethoxypropane, diethoxybutane and the like. Although R, $R^1$ and $R^2$ can each contain about 6 or more carbon atoms, it is preferred to use acetals wherein R is hydrogen or methyl and $R^1$ and $R^2$ are methyl, ethyl or propyl. In addition, $R^1$ and $R^2$ can be alike or unlike but to insure that the chemically stable group at the polymer termini is predictable, it is preferred that $R^1$ and $R^2$ are alike.

The amount of acetal useful in the process of the present invention can vary within wide limits. It is preferred to use at least 2 moles of acetal for each mole of resultant polymer to provide a chemically stable group at the polymer termini. When less than about 2 moles of acetal for each mole of resultant polymer is used, there is a corresponding decrease in the yield of the polymer that is stabilized against rapid depolymerization in alkaline solution. It is preferred to use an excess amount of acetal and to insure that there is a sufficient amount of acetal to maximize yields, it is preferred to use at least about a 20 percent molar excess over the 2 moles of acetal for each mole of resultant polymer. For example, if an acetal carboxylate homopolymer is prepared having a chain length which averages about 50 repeating units, then about 0.04 mole of acetal would be required for each mole of acetal carboxylate monomer. To provide a 20 percent molar excess, about 0.05 mole of acetal would be required. Greater quantities can be used since the excess acetal can readily be recovered from the stabilized polymer.

Because the resulting polymer obtained from the glyoxylate ester and the polymerization initiator may be somewhat viscous, a suitable solvent may be used during the step of adding to the resultant polymer a sufficient amount of an acetal and an agent to remove liberated alcohol. Any number of solvents known to those skilled in the art can be used, preferably at levels from about one-third to about 1 volume of solvent for each volume of polymerized acetal carboxylate. Suitable solvents include: acetone, methylene chloride and the like as well as the acetals which can be used for the solvent during this step in the process.

Agents to remove liberated alcohol in the process of the present invention are known to those skilled in the art. It is believed that the liberated alcohol is a by-product obtained when the chemically stable end group derived from the acetal is added to the polymer termini. Any number of agents can be used. It is only necessary that the agent does not react with the polymer or the other reagents and effectively removes the alcohol from solution. Suitable agents include those that will react with the alcohol such as phosphorus pentasulfide or phosphorus pentoxide and the like. Other agents can absorb the alcohol from solution, such as molecular sieves which are zeolites (alkali metal alumino silicates) having an open network structure commonly used to separate mixtures by selective adsorption of one or more of the constituents, e.g., methane from isoparaffins. The channel size of the open network structure is commonly measured in angstrom units (A) and it is common to identify particular molecular sieves as 3 A molecular sieves, 4 A molecular sieves, etc., meaning that the particular sieve has channels 3 angstroms in diameter or 4 angstroms in diameter, respectively. Molecular sieves having channel diameters of about 3 A or larger provide satisfactory results in the process of the present invention. The use of phosphorus pentoxide or 3 A molecular sieves in preferred.

It has been found that some alcohol-removing agents, such as phosphorus pentoxide, may be too reactive under certain conditions and react with the acetal or the polymer during the endcapping reaction when the R in the acetal formula:

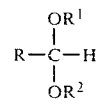

is an alkyl. Under such conditions, the use of a less reactive reagent, such as molecular sieves, is preferred.

The amount of alcohol-removing agent for use in the process of the present invention should be at least sufficient to remove most of the alcohol formed during the reaction to add the chemically stable group to the polymer termini. A large excess is preferred to insure that high yields of polymer are obtained. For example, in the case of an agent that removes the liberated alcohol by adsorption, such as molecular sieves, it is preferred to use as much as ten times the amount theoretically reuired to remove the alcohol. Optimum amounts and choices of alcohol-removing agents for use in the process of the present invention can readily be determined by those skilled in the art by routine experimentation.

Any number of acids known to those skilled in the art can be used as acid catalysts in the process of the present invention. It is only necessary to provide sufficient acidity to catalyze the addition of a chemically stable group derived from the acetal to the termini of the resulting polymer. As will occur to those skilled in the art, certain oxidizing acids may cause undesirable side reactions. Optimum amounts and choice of acid can be determined by routine experimentation. Suitable acid catalysts include hydrochloric acid, trifluoroacetic acid and the like. When phosphorus pentoxide is used as the agent to remove liberated alcohol, it is generally not necessary to add any other acid since the phosphorus pentoxide generates sufficient acidity to act as a catalyst. However, when molecular sieves are used as the agent to remove liberated alcohol, it is necessary to add an acid, such as trifluoroacetic acid or phosphoric acid, to act as a catalyst.

The sequence of addition of the acetal, the agent to remove liberated alcohol, and if necessary any acid to act as a catalyst can vary widely. The acetal can even be present during the polymerization provided, of course, that an acid is not used to initiate the polymerization. In such a case the acetal appears to function simply as additional solvent during the polymerization. An acid or acid-generating material (e.g., $P_2O_5$) should only be added after polymerization is complete, and stabilization of the polymer against rapid depolymerization in alkaline solution is the desired step. At that time the acetal, if not already present, the agent to remove liberated alcohol, and, if necessary, additional acid to act as a catalyst can be added in any order. It is preferred to add the acetal first, then any necessary acid to act as a catalyst, and then the agent to remove liberated alcohol.

The conditions for adding the chemically stable group derived from the acetal to the polymer termini according to the process of the present invention can vary within wide limits depending on the desired average chain length. The unstabilized polymer is in equilibrium with the monomer, and lower temperatures favor the formation of the polymer. Consequently, endcapping at lower temperatures provides a polymer with a higher average chain length. In addition, temperature control during endcapping will influence molecular weight distribution since wide fluctuations in temperature during the endcapping reaction will produce greater variations in the molecular weight. To produce a polymer suitable for detergent applications, it is preferred to maintain the temperature range during the reaction from about $-10°$ C. to about $10°$ C. Satisfactory results are obtained at atmospheric pressure although higher or lower pressures could be used as will occur to those skilled in the art.

The polymer which is now stabilized against rapid depolymerization in alkaline solution is useful as an intermediate to prepare the corresponding alkali metal, ammonium or alkanol amine salts. It is only necessary to saponify the stabilized polymeric ester with an alkali metal hydroxide, such as lithium hydroxide, sodium hydroxide, potassium hydroxide and the like, using conventional saponification techniques to make a salt suitable for use as a builder and as a sequestrant. The ammonium or alkanol amine salts can be prepared from the corresponding alkali metal salts using conventional ion exchange techniques.

The amount of polymer salt required to effectively complex the ions in a given system will depend to some extent on the particular polymer salt being used and the particular metal ion in the aqueous medium. Because the polymer tends to depolymerize in acid media, effective complexing is limited to neutral or preferably basic solution. Optimum conditions and amounts of the polymer salt to be used can readily be determined by routine experimentation.

The polymer salts are also useful as builders in detergent formulations. Since the pH of the detergent solution is usually between pH 9 and pH 11, the polymer salts will not depolymerize rapidly when used as a detergent builder in aqueous solution at normal use concentrations (about 1200-1500 ppm formulation in the wash water), temperatures ($10°-60°$ C.) and times (i.e., about 15 minutes) typical of United States home laundry practices. Generally the use of the alkli metal salts, particularly the sodium salt, is preferred. However, in some formulations where greater builder solubility is required, the use of ammonium of alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordace with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous glyoxylate ester useful to prepare the polymers of the present invention.

A 2-liter, 4-necked, round bottom flask equipped with an overhead stirrer, thermometer and 30 centimeter Vigreaux column and take-off head, is charged with 1200 grams (10 moles) of methyl glyoxylate methyl hemiacetal. A total of 568 grams of phosphorus pentoxide (4 moles) is added in 4-6 portions, keeping the reaction temperature below $90°$ C. The addition requires about 90 minutes. When the addition is complete, the mixture is stirred until the temperature has fallen to about $70°$ C. (0.5 hour). The mixture is distilled at aspirator vacuum (20-40 torr) yielding 764 grams crude methyl glyoxylate having a boiling point of $56°-61°$ C.; the distillation is stopped when the pot temperature reaches $125°$ C. Since a violent decomposition may occur at higher temperatures. Chromatographic analysis of this crude material indicates 86.6 percent glyoxylate, 9.3 percent methyl dimethoxyacetate, 3.3 percent dimethyl oxalate and trace amounts of unidentified products.

The crude product is then distilled from 25 grams of 3 A molecular sieves (which had been heated to about 250° C. to drive off residual moisture and organics) through the Vigreaux column. A 15-gram forecut of about 97 percent pure glyoxylate is collected initially. The Vigreaux column is replaced by a 30 centimeter Widmer column and 521 grams of 99 percent pure polymerizable grade methyl glyoxylate is collected having a boiling point of 83°-84° C. at 210 torr. A final cut of 36 grams (93 percent pure) ester is collected in a final fraction (91°-94° C., 210 torr). The overall yeld of polymerizable glyoxylate is 59 percent from the hemiacetal.

The polymerizable glyoxylate is stored in a glass-stopped bottle at −70° C. until ready for use.

EXAMPLE II

This Example illustrates the process of the present invention using dimethoxymethane as the acetal and phosphorus pentoxide as the alcohol-removing agent.

To a 100 milliliter, 3-necked, rough bottom flask equipped with an efficient stirrer and a thermometer was added 17.6 grams of glyoxylate ester from Example I (0.2 mole) and 4.5 milliliters of methylene chloride. The mixture was cooled to about 0° C. and then 150 microliters of 0.05 molar sodiodimethyl methyl malonate in tetrahydrofuran was added. The temperature rose to about 33° C. The mixture was cooled to 0° C. and stirred at that temperature for about 1 hour. Then, 4.6 grams (0.06 mole) of dimethoxymethane and 4.4 grams (0.03 mole) of phosphorus pentoxide was added to the reaction flask. To aid in stirring, another 4.6 grams of dimethoxymethane was added to the flask. The mixture was stirred for about 16 hours at 0° C.

Then, the mixture was poured into about 60 milliliters of 2 molar sodium hydroxide and stirred for about 5 minutes. This mixture was washed three times with saturated sodium bicarbonate solution. Then there was added with cooling and stirring, 25 milliliters of 10 normal NaOH solution. Cooling was necessary to maintain the temperature below 40° C. The mixture was stirred for two hours and then about 40 milliliters of methanol was added. The solution was stirred for about 30 minutes and a white precipitate was collected on a sintered glass funnel. It was washed twice with methanol and twice with diethyl ether and dried for 1 hour on the sintered glass funnel using aspirator vacuum. The yield was about 76 percent, based on the amount of monomer charged to the reaction flask.

The white powder was analyzed by Nuclear Magnetic Resonance and high performance liquid chromatography (HPLC) revealing that the material was a polymer believed to consist mainly of the following structure:

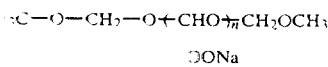

ONa where n averages about 100.

A sample of the polymer is tested for sequestration function using the procedure described by Matzner et al "Organic Builder Salts as Replacements for Sodium Tripolyphosphate" TENSIDE, 10, No. 3, pages 119–125 (1973). The sequestration of calcium ions and magnesium ions as a percent of STPP performance for the polymer salt is about 138 percent of STPP.

EXAMPLE III

This Example illustrates the process of the present invention using diethoxymethane as the acetal and phosphorus pentoxide as the alcohol-removing agent.

The general procedure of Example II was repeated except that diethoxymethane was used instead of dimethoxymethane. The yield was 73 percent and the polymer is believed to consist mainly of the following structure:

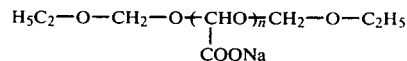

where n averages about 65.

The sequestration of calcium ions and magnesium ions as a percent of STPP performance for the polymer salt is about 110 percent of STPP.

EXAMPLE IV

This Example illustrates the use of dimethoxyethane as the acetal and molecular sieves as the alcohol-removing agent.

To a 100-milliliter, 3-necked, round bottom flask equipped with an efficient stirrer and thermometer was added 17.6 grams (0.2 mole) of glyoxylate ester from Example I, 3 milliliters of dry acetonitrile, and 4 milliliters of dimethoxyethane. The mixture was cooled to −10° C., and 50 microliters of 0.05 molar sodiodimethyl methylmalonate in tetrahydrofuran was added to the flask. The temperature rose to about 20° C. The flask was cooled to 0° C., and 67 microliters of trifluoroacetic acid (0.0004 mole) and 4 grams of 4 A molecular sieves (activated by previously heating to 250° C.) were added. After stirring for 24 hours at room temperature, the resulting gum was washed two times for 5 minutes each with 25-milliliter portions of a 60:40 volume ration of diethyl ether:petroleum ether mixture. Then, 28 milliliters of 8 molar sodium hydroxide was added to the gum dropwise over a 5-minute period. The resulting slurry was stirred for 16 hours at room temperature. Twenty milliliters of methanol were added, the slurry ws stirred for 1 hour, and the solids were recovered by filtration. The solids were added to 75 milliliters of deionized water, the insoluble portion was removed by filtration, and the polymer was precipitated by adding 20 milliliters of methanol to the filtrate, and recovered by filtration. The yield of polymer was 15 percent based on the amount of glyoxylate ester added to the flask.

The polymer was analyzed by Nuclear Magnetic Resonance and HPLC. From these analyses the polymer is believed to consist mainly of the following structure:

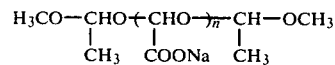

where n averages about 45.

The sequestration of calcium ions and magnesium ions as a percent of STPP performance for the polymer salt is about 112 percent of STPP.

EXAMPLE V

This Example illustrates the process of the present invention using diethoxyethane as the acetal.

The general procedure of Example IV was repeated except that diethoxyethane was used instead of dimethoxyethane. The yield of polymer was about 20 percent, based on the amount of monomer charged, and the polymer is believed to have the following molecular structure:

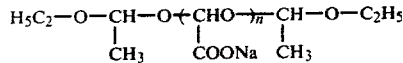

where n averages about 75.

The sequestration of calcium ions and magnesium ions as a percent of STPP performance for the polymer salt is about 117 percent of STPP.

Although the invention has been described in terms of specified embodiments which are set forth in considerable detil, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. In a process for preparing an acetal carboxylate polymer wherein a glyoxylate ester and a polymerization initiator are brought together under polymerization conditions, and a chemically stable end group is added to the termini of the resulting polymer to stabilize the polymer against rapid depolymerization in alkaline solution, the improvement which comprises contacting the resulting polymer in the presence of an acid catalyst with a sufficient amount of an acetal having the formula:

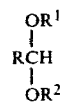

wherein R is hydrogen or alkyl having from 1 to about 6 carbon atoms, and $R^1$ and $R^2$ are individually an alkyl having from 1 to about 6 carbon atoms, to stabilize the resulting polymer against rapid depolymerization in alkaline solution, and an agent to remove liberated alcohol.

2. In a process of claim 1 wherein the agent is a molecular sieve with a channel diameter of at least about 3 A.

3. In a process of claim 1 wherein the agent is a 3 A molecular sieve.

4. In a process of claim 1 or 3 wherein $R^1$ and $R^2$ are methyl or ethyl.

5. In a process of claim 4 wherein R is methyl or hydrogen.

6. In a process of claim 1 wherein R is hydrogen and the agent is phosphorus pentoxide.

7. In a process of claim 6 wherein $R^1$ and $R^2$ of the acetal are methyl or ethyl.

8. In a process of claim 1, 3 or 6 wherein the stabilized polymer is saponified with an alkali metal hydroxide.

* * * * *